Sept. 13, 1927.
A. BOYD
BLEEDER
Filed Feb. 7, 1927
1,642,536
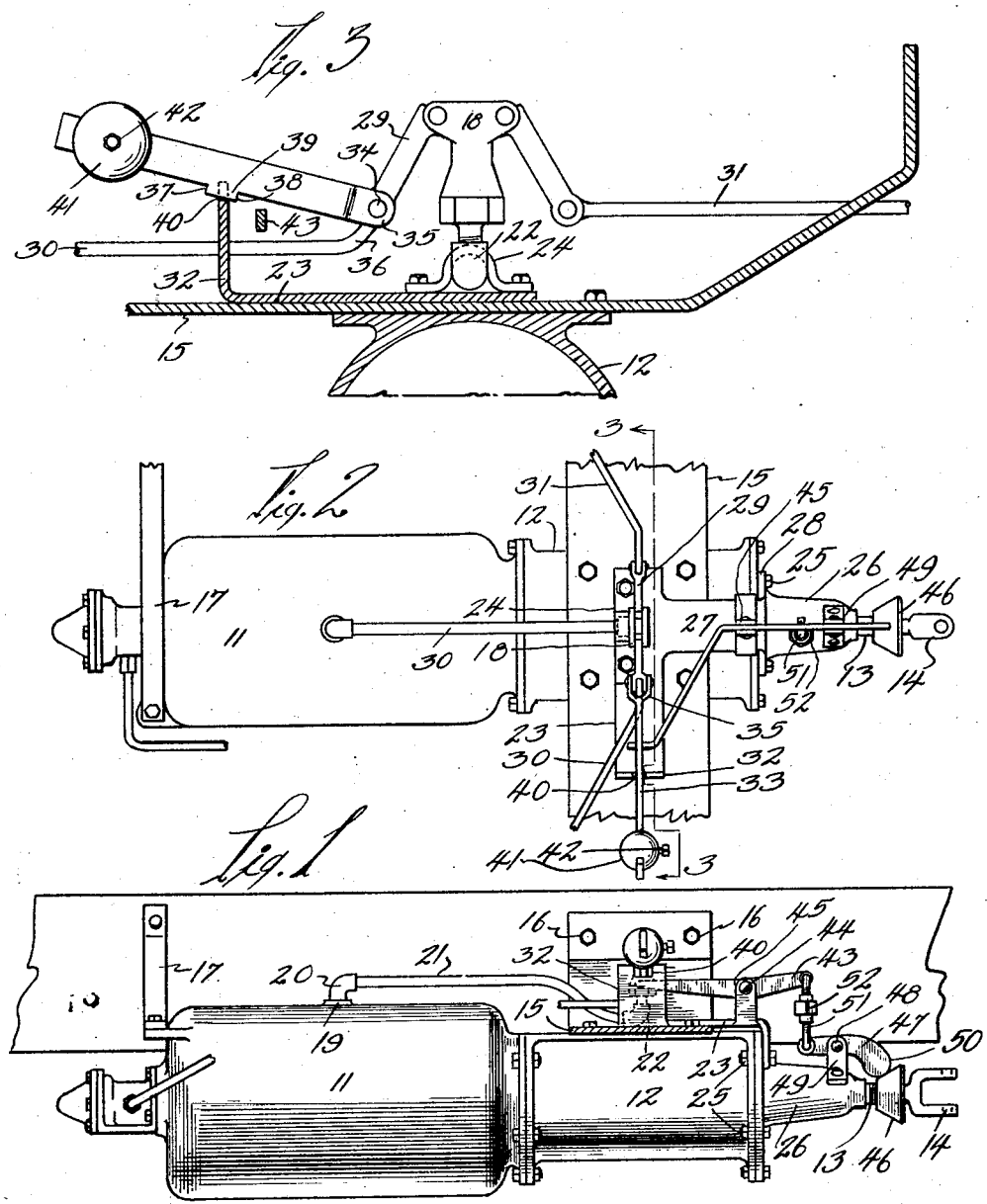
Inventor
Allen Boyd
By Lynn H Latta
Attorney Patented Sept. 13, 1927.

1,642,536

UNITED STATES PATENT OFFICE.

ALLEN BOYD, OF SIOUX CITY, IOWA.

BLEEDER.

Application filed February 7, 1927. Serial No. 166,405.

My invention relates to railway car bleeders and my purpose is to provide an attachment for the usual bleeders for locking the valve in open position until the brake cylinder has been fully bled and then releasing the locking mechanism to allow closing of the valve.

More specifically, it is my object to provide such a device in which a latch is attached to the valve lever and cooperates with a keeper in such a way as to become latched when the valve lever has been moved to open the valve.

A release mechanism, actuated by the movement of the brake piston rod toward the cylinder as the air pressure is released, finally operates to release the latched connection of the latch and keeper, thus allowing the valve to return to normal closed position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is an elevation of a longitudinal beam of a car structure, the usual brake mechanism, including brake cylinders and brake piston rod being shown attached thereto in the usual manner and my invention being embodied therewith, one of the cylinder supporting brackets being shown in section.

Fig. 2 is a plan view of the brake and bleeder mechanism.

Fig. 3 is an enlarged sectional view taken on the line 3—3 of Fig. 2.

In the operation of the ordinary air brake system upon railway trains, it is customary to release the brakes upon standing box cars and the like by what is termed bleeding. This operation involves the release of air from the brake cylinders through a bleeding valve which is shown in its usual form in the drawings.

I have used the reference character 10 to indicate generally a longitudinal beam of a railway car which supports the air brake apparatus, a large cylinder 11, a small cylinder 12, and a piston rod 13, slidably mounted in the cylinders; since the conventional brake mechanism is illustrated, it is thought unnecessary to show or describe its structure in detail. The clevis to which the piston rod 13 is attached to the brake beam is shown at 14. The brake mechanism is supported by an ordinary form of bracket 15 bolted to a flange on the cylinder 12, bolted as at 16 to the beam 10 and a smaller bracket 17 similarly secured between the cylinder 11 and the beam 10.

The bleeding valve 18, (which is ordinarily threaded directly into the cylinder 11, being received in a threaded boss 19) is extended to a position over the small cylinder 12 by any suitable means such as the elbow 20, threaded into the boss 19, the pipe 21 threaded into the elbow 20 and the elbow 22 which receives the valve 18. The elbow 22 is secured to a bracket 22 in any suitable manner such as by the yoke 24 and the bracket 23 in turn is secured to the bolts 25 which ordinarily hold the packing gland 26 in place at the end of the small cylinder. To this end the bracket 23 is made somewhat T shaped, having the leg 27, which extends over the end of the cylinder and the downwardly bent flange 28 which receives the bolts 25.

The bracket 23 serves not only to support the bleeder valve in its new position, but supports the latching mechanism constituting my invention. It will be thus seen that the attachment involves no change in the structure of the brake mechanism other than the addition of the pipe 21 and the elbows 20 and 22 and the removal of the bolts 25. No drilling is required to attach the device, The valve lever, a double arm type comprising an inverted U shaped member is shown at 29. The specific construction of the valve lever is not illustrated, it being understood that movement of either of the arms of the lever either toward or from the body of the valve will accomplish the object of opening the valve. This is to enable bleeding from either side of the car and a pair of bleeding rods 30 and 31 are connected to the respective arms of the valve lever for this purpose. As one arm of the lever is moved toward the body of the valve, the other arm will move away from it. One arm of the T shaped bracket 23 is extended and bent upwardly as at 32 to provide a keeper for the latch arm 33 which is pivoted to one of the arms 29 of the valve lever. The usual pin, used to connect the arm 29 and rod 30, is removed and a longer pin 34 substituted, the end of the lever arm 33 being bifurcated, as at 35, to receive the end of the arm 29.

The rod 30 is bent downwardly as at 36 so as not to interfere with the operation of the latch arm 33. I provide two detents for the latch arm 33, formed as shoulders 37 and 38 on either side of an integral lug 39. The lug 39 normally rests in a slot 40 in the keeper 32 and the latch arm is weighted as at 41 so that when the valve lever is moved in either direction to open the valve, the lug 39 will drop past the edge of the slot 40 on one side or the other of the keeper 32, allowing either of the detent shoulders to engage the keeper and thereby lock the lever in such position.

The weight 41 is made adjustable by a set screw 42 by means of which the weight is secured to the arm 33. By sliding the weight longitudinally of the arm, the correct weight for most efficient operation under such weather conditions as where ice is likely to form on the parts is obtained.

The release mechanism includes a lift lever 43 fulcrumed at 44 to a pair of ears 45, bent upwardly from the leg 27 to the bracket 23. One end of the lift lever 43 extends under the latch arm 33, being spaced sufficiently away from the keeper 32 so that it will not interfere with the dropping of the lug 39 past the edge of the slot 40. (See Fig. 3.)

It will also be noted that the end of the lever 43 is spaced downwardly sufficiently to allow the lever to drop to latching position.

I provide a cam 46 which is secured to the piston rod 13, as by threading, and which is preferably cone shaped as shown. A lever 47 is pivoted at 48 to a bracket 49, secured to the packing gland 26 and has a rounded end 50 to engage the cam 46 when the piston rod has moved toward the cylinders a predetermined distance. The other end of the lever 47 is connected to the lever 43 by an adjustable link 51, preferably including a turnbuckle 52 for longitudinal adjustment. Such longitudinal adjustment is advantageous in setting the two levers in proper positions relative to both latch arm and cam. The single adjustment is sufficient for this purpose although longitudinal adjustment of the cam on the piston rod may be necessary in the original setting up of the device.

It will now be seen that as the piston rod moves into the cylinders upon release of pressure by the valve, the cam 46 will eventually reach the position shown in Fig. 1 and thereupon raise the outer end of the lever 47, causing the outer end of the lever 43 to correspondingly raise. The lever 43 will engage the arm 33, lifting it upwardly until a position is reached in which the lug 39 may slide again into the slot 40 whereupon the lever 43 may recede to its original position so as not to interfere with the subsequent bleeding of the valve.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a bleeder, in combination with an air brake cylinder provided with a brake piston rod and a bleeder valve, a latch arm pivoted at one end to an operating lever of said valve, a keeper supporting the intermediate portion of said arm, the arm being provided with a detent to engage the keeper when the valve has been opened, and to thereby lock the valve in open position, a cam secured to the brake piston rod, and means actuated by said cam to lift the arm and release the detent from engagement with the keeper, when the piston rod has moved a predetermined distance toward the cylinder.

2. In a bleeder, in combination with an air brake cylinder provided with a brake piston rod and a bleeder valve, a latch arm pivoted at one end to an operating lever of said valve, a keeper supporting the intermediate portion of said arm, the arm being provided with a detent to engage the keeper when the valve has been opened, and to thereby lock the valve in open position, and means actuated by the piston rod to lift the arm and release the detent from engagement with the keeper, when the piston rod has moved a predetermined distance toward the cylinder.

3. In a bleeder, in combination with an air brake cylinder provided with a brake piston rod and a bleeder valve, a latch device connected to an operating lever of the valve, a keeper cooperating with said latch device to lock the valve in open position, and means actuated by the piston rod to release the latch device when the piston rod has moved a predetermined distance toward the cylinder.

4. In a bleeder, in combination with an air brake cylinder provided with a brake piston rod and a bleeder valve, a latch device connected to an operating lever of the valve, a keeper cooperating with said latch device to lock the valve in open position, a cam secured to the piston rod, and means actuated by said cam to release the latch device when the piston rod has moved a predetermined distance toward the cylinder.

5. In a bleeder, in combination with an air brake cylinder provided with a brake piston rod and a bleeder valve, a latch arm pivoted at one end to an operating lever of said valve, a keeper supporting the intermediate portion of said arm, the arm being provided with a detent to engage the keeper when the valve has been opened, and to thereby lock the valve in open position, a cam secured to the brake piston rod, a lift lever fulcrumed upon the cylinder and having one end positioned to engage the latch arm, a lever fulcrumed at the end of the cylinder and having one end positioned to be engaged by the cam, and a link connecting the other ends of the respective lift and cam levers.

6. In a bleeder, in combination with an air brake cylinder provided with a brake piston rod and a bleeder valve, a latch arm pivoted at one end to an operating lever of said valve, a keeper supporting the intermediate portion of said arm, the arm being provided with a detent to engage the keeper when the valve has been opened, and to thereby lock the valve in open position, a cam secured to the brake piston rod, a lift lever fulcrumed upon the cylinder and having one end positioned to engage the latch arm, a lever fulcrumed at the end of the cylinder and having one end positioned to be engaged by the cam, and a link connecting the other ends of the respective lift and cam levers, said link being adjustable in length.

7. In a bleeder, in combination with an air brake cylinder provided with an air brake piston rod and a bleeding valve, means to lock the valve in open position, a cam secured to the piston rod and means actuated by said cam to release the locking means when the piston rod has moved a predetermined distance toward the cylinder.

8. In a bleeder, in combination with an air brake cylinder provided with an air brake piston rod and a bleeding valve, means to lock the valve in open position, and means actuated by the piston rod to release said locking means when the piston rod has moved a predetermined distance toward the cylinder.

Signed this 3rd day of February 1927, in the county of Woodbury and State of Iowa.

ALLEN BOYD.

DISCLAIMER.

1,642,536.—*Allen Boyd*, Sioux City, Iowa. BLEEDER. Patent dated September 13, 1927. Disclaimer filed April 19, 1929, by the patentee.

Hereby enters this disclaimer to the following subject matter of said Letters Patent:

A. Claim 8.

B. The invention of claim 7, except when said invention is limited to a cam having an inclined face to engage the means for releasing the locking means of said claim.

C. The invention of claim 3, except when said invention is limited to a construction wherein the keeper of said claim is supported independently of the valve operating lever of said claim.

D. The invention of claim 4, except when said invention is limited to a construction in which the keeper of said claim is supported independently of valve operating lever of said claim.

[*Official Gazette May 7, 1929.*]